United States Patent [19]
Murray

[11] Patent Number: 5,586,722
[45] Date of Patent: Dec. 24, 1996

[54] TEMPERATURE AND FLOW CONTROL VALVE

[76] Inventor: Jerome L. Murray, 12 Aldersgate Cir., Budd Lake, N.J. 07828

[21] Appl. No.: 435,188

[22] Filed: May 5, 1995

[51] Int. Cl.$^6$ .................................................. G05D 23/08
[52] U.S. Cl. .......................................... 236/93 B; 137/75
[58] Field of Search ............................... 236/93 B, 93 R; 137/74, 75

[56] References Cited

U.S. PATENT DOCUMENTS

| | | | |
|---|---|---|---|
| 1,030,911 | 7/1912 | Migliavacca | 137/75 |
| 1,752,677 | 4/1930 | Lovekin | 137/75 |
| 2,301,014 | 11/1942 | Burklin | 137/75 |
| 3,690,336 | 9/1972 | Drum | 137/75 |
| 3,877,476 | 4/1975 | Mills | 137/75 |
| 3,955,589 | 5/1976 | Beazley | 137/75 |
| 4,570,851 | 2/1986 | Cirillo | 236/93 R |
| 5,123,593 | 6/1992 | Rundle | 236/93 B |
| 5,368,227 | 11/1994 | McGinnis | 236/92 R |
| 5,397,053 | 3/1995 | Ewing et al. | 236/93 B |

Primary Examiner—William E. Tapolcai
Attorney, Agent, or Firm—Bernard J. Murphy

[57] ABSTRACT

A simple, one-chamber housing, having a uniformly increasing chamber diameter, has a generally ball-shaped valving element therewithin, and opposite ends of the housing are ported to admit and discharge fluid into and from the chamber. The element is freely translatable within the chamber, being guided on a housing-traversing rod, between a valve seat at one end of the housing, and abutments adjacent the other end of the housing. A first spring biases the element away from the valve seat, and second, more powerful spring is restrainingly held at the other end of the housing, ready to overpower the first spring, and force the element onto the seat, to close off the discharge porting, when inordinately elevated-temperature fluid enters the housing. A temperature-responsive arrangement, at the other end of the housing, is operative to release the second spring, and an element-confronting piston to cause the piston to bottom the element in the seat and seal off the discharge porting, until the temperature of the fluid modulates. The rod, then, is used to reset the second spring to its restrained disposition.

18 Claims, 1 Drawing Sheet

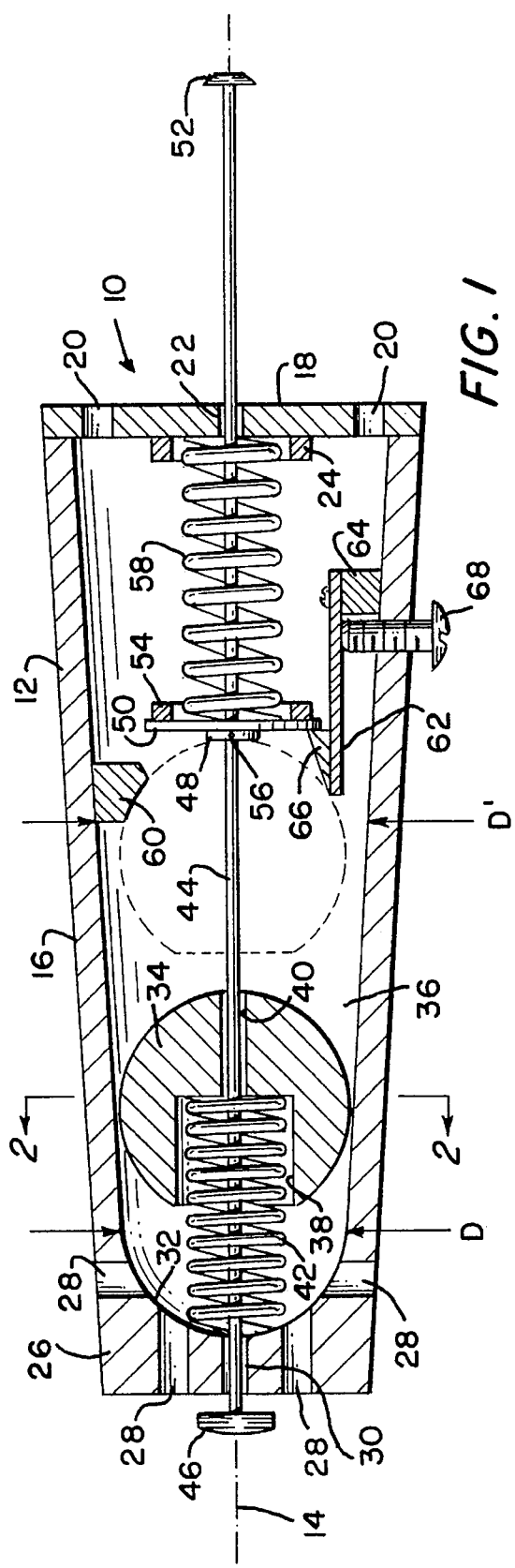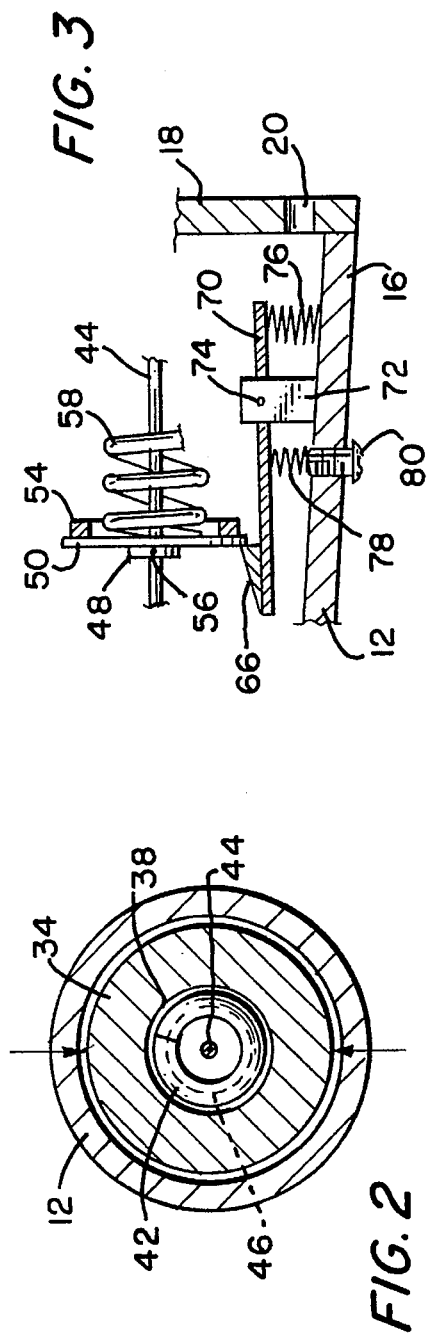

TEMPERATURE AND FLOW CONTROL VALVE

This invention pertains to fluid control valves, and in particular to a novel fluid control valve which is responsive to an excessively high fluid temperature to shut off the valve, and which automatically tracks diverse fluid pressures to deliver fluid therefrom at a controlled rate of flow. Such a valve finds especial utility in water-shower heads, and the like.

Fluid control valves which shut off the fluid flow, in response to excessively high fluid temperatures, are well known in the prior art. Exemplary thereof is the U.S. Pat. No. 2,556,777 issued on Jun. 12, 1951, to C. J. Reimuller, for a Thermostatically Control Valve for Shower Heads, and U.S. Pat. No. 5,123,593, issued to G. E. Rundle, on Jun. 23, 1992, for a Manual Override Heat Sensitive Valve. These concepts are commendable in many respects, however, they appear to be complex and expensive of manufacture. The Reimuller Valve requires a body which, with the water piping associated therewith, has to have four, distinct chambers, and a valving element formed with serrations. The Rundle Valve has a body which calls for seven centrally located bores or chambers, two parallel bores for a bypass button, and four springs, in which one of the springs has to be thermally active.

There has been a long unmet need for a simpler fluid control valve which is of uncomplicated structure, relatively inexpensive to fabricate, and a valve which is responsive to an excessively high fluid temperature to quickly shut off the fluid flow therethrough, until the temperature modulates and it can be reopened, and such a valve which, in addition, is responsive to varying levels of fluid pressure to discharge fluid therefrom at a substantially constant rate of flow. It is an object of this invention, then, to set forth just such a long sought valve, to obviate the expense and complication of structure which the prior art valves necessitate.

Particularly, it is an object of this invention to set forth a temperature and flow control valve comprising a valve housing having a given axis; first means at one axial end of said housing for admitting fluid therethrough and into said housing; and second means at the opposite axial end of said housing for discharging fluid therethrough and from said housing; wherein said second means has a valve seat formed therewithin; valving means, within said housing, and movable both toward and away from said seat for (a) closing off said second means to prohibit fluid flow through said second means, and (b) accommodating fluid flow through said second means, respectively; means within said housing, and interposed between said seat and said valving means, for urging said valving means away from said seat; barrier means, within said housing, for barring movement of said valving means to said one axial end of said housing; piston means interposed between said barrier means and said first means for moving said valving means onto said seat for closure of said second means to fluid flow therethrough; and wherein said barrier means comprises means (a) for restraining said piston means from causing movement of said valving means, and (b) responsive to a given temperature of admitted fluid for releasing said piston means, to permit said piston means to move said valving means onto said seat, respectively.

It is also an object of this invention to disclose a temperature and flow control valve, comprising a housing having a circumferential wall, and a given axis; first means at one axial end of said housing for admitting fluid therethrough and into said housing; and second means at the opposite end of said housing for discharging fluid therethrough and from said housing; wherein said second means has a valve seat formed therewithin; valving means, within said housing, and movable both toward and away from said seat for (a) closing off said second means to prohibit fluid flow through said second means, and (b) accommodating fluid flow through said second means, respectively; wherein said valving means comprises means cooperative with said wall for metering fluid discharge through said second means; and barrier means, mounted to said wall, for barring movement of said valving means to said one axial end of said housing; and means interposed between said barrier means and said first means for moving said valving means onto said seat; wherein said barrier means is normally operative for preventing said interposed means from moving said valving means, and operative in response to a given temperature of admitted fluid for permitting said interposed means to move said valving means to said seat.

Further objects of this invention, as well as the novel features thereof will become apparent by reference to the following description, taken in conjunction with the accompanying figures, in which:

FIG. 1 is an axial cross-sectional view of the novel valve, according to an embodiment thereof;

FIG. 2 is a cross-sectional view taken along section 2—2 of FIG. 1; and

FIG. 3 is a fragmentary view of an alternative embodiment.

As shown in FIG. 1, the valve 10 comprises a housing 12 having a longitudinal axis 14 and a circumferential wall 16. A header 18, at one axial end of the housing 12 has a plurality of fluid-admitting holes 20 formed therein as well as a centrally located bore 22. The inner surface of the header 18 has an annulus 24 fixed thereto. At the opposite end of the housing 12 is another header 26, the same also having a plurality of fluid-conducting holes 28 formed therein, and another centrally located bore 30. Header 26, which is integral with the wall 16, has a valve seat 32 formed therein. A substantially ball-shaped valving element 34 is confined within the housing 12 within a fluid chamber 36 defined by the headers 18 and 26 and the wall 16. The valving element 34 has a pair of bores 38 and 40 formed therein. The bore 38 nests therein one end of a compression spring 42; the other end of the spring 42 is set against the seat 32. Bore 40 slidably receives a rod 44 therethrough.

Rod 44 protrudes through bore 30 in header 26, and extends outwardly of the valve housing 12 where it terminates in a button 46. The other end of the rod 44 penetrates a disc 48 and a piston 50, and extends through the bore 22 in header 18, this end of the rod 44 also extending outwardly from the housing 12 and terminating in a limit stop 52. Piston 50 also has an annulus 54 fixed thereto on the side thereof which is opposite the disc 48. A pin 56 secures the disc 48 to the rod 44 for coincident movement with the rod. Another compression spring 58 is interposed between the piston 50 and the header 18, being piloted in the annuli 24 and 54.

Fixed to an inner surface of the wall 16 is an abutment 60. Also mounted to the inner surface of the wall 16 is a limb 62, the same being mounted in cantilevered fashion on a support 64. The cantilevered end of the limb 62 has a tapered ramp 66. Finally, an adjustment screw 68 is in threaded penetration of the wall 16, with the leading end thereof confronting the limb 62.

Spring 58 is under compression, and restrained from moving the piston 50 toward the left-hand end of the chamber 36 by the limb 62 and its abutment 66. However, the limb 62 is thermally-responsive; it is formed of beryllium copper. Accordingly, upon the limb 62 being exposed to admitted fluid of a given, elevated temperature, it bends, drawing its pendant or cantilevered end toward the wall 16. In the circumstances, the spring 58 is released, and it allows the piston to travel toward the element 34. Spring 42 normally holds the element 34 off the seat 32, but it has only a moderate biasing force, whereas spring 58 has a much greater biasing force. Spring 58, then, overcomes the bias of spring 42, the piston engages the element 34, and forces it onto the seat 32; spring 42 contracts and becomes wholly confined within the bore 38. The admitted fluid, then, is prevented from discharging through the holes 28. Too, in that the disc 48 is pinned to the rod 44, by the pin 56, it too travels to the left. This draws the limit stop 52 substantially to the header 18, and extends the rod end, with the button 46, well beyond the left-hand axial end of the housing 12.

Until the fluid temperature is modulated sufficiently, to allow the limb 62 to return to its normal, linear configuration, the valve 10 will not allow the fluid to transit the housing 12. Where the valve seat 32 and the left-hand end of the chamber 36 fair into each other, the diameter of the housing is of the measure "D", as shown in FIG. 1. Too, the diameter of the element 34 is of the same diameter "D", as represented in FIG. 2. With the element 34 set firmly in the seat 32, the fluid discharge holes 28 are effectively closed off.

When the fluid temperature is reduced, moderated sufficiently, the piston 50 can be retracted to permit the spring 42 to move the element 34 off of the seat so that fluid flow through the valve 10 can occur. In these circumstances, one can push the button 46 to translate the rod 44 in the right-hand direction to where the piston 50 will engage the ramp 66. While the limb 62 has regained its linear form, it remains flexible and the piston 50 can negotiate the ramp 66, deflecting the limb 62 sufficiently, temporarily, to allow the piston 50 to move behind the abutment represented by the ramp 66.

With the piston 50 retracted, and the powerful spring 58 contracted, the spring 42 is free to displace the element 34 as far to the right-hand end of the chamber 36 as the pressure of the admitted fluid will allow, but the element 34 cannot travel to the header 18. An abutment 60, depending from the wall 16, cooperates with limb 62 and the ramped abutment 66 to stop its travel thereat.

The valve, in a novel way, controls the fluid flow rate therethrough. It will be noted that, whereas the left-hand end of the chamber 36 has a diameter "D", the chamber has a uniformly increasing diameter toward the right-hand end thereof; the diameter of the chamber 36, at the abutment 60, for instance, is "D'". The diameter "D" of the elment, for being fixed, exposes a widening, annular gap between its outer periphery and the wall 16 as it travels to the right. Now then, if the admitted fluid is under a pressure of twenty or twenty-five pounds per square inch, for example, the spring 42 will be able to displace the element a considerable distance to the right. If the fluid pressure, however, should be in the order of fifty pounds per square inch, then the pressure will significantly challenge the bias of the spring 42. The latter will contract to some significant degree, permitting the element 34, sliding along the rod 44, to close into some given proximity to the seat 32. Then, the annular gap obtaining between the element 34 and the wall 16 will be markedly narrowed, and the fluid flow through the chamber 36 will be correspondingly throttled.

The responsiveness of the limb 62 to the temperature environment which it senses can be regulated by an adjustment screw 68 which penetrates the wall 16 and has its leading end disposed for engagement with the limb 62. Obviously, by advancing the screw 68, it will require a greater fluid temperature to withdraw the abutment ramp 66 from the path of the piston 50, and retraction of the screw 68 will render the valve 10 responsive to less elevated fluid temperatures to shut off fluid flow.

While I have described my invention in connection with a specific embodiment thereof, it is to be clearly understood that this is done only by way of example, and not as a limitation to the scope of the invention as set out in the appended claims. FIG. 3, for instance, depicts an alternative embodiment which the may take. Therein the beryllium copper limb 62 is replaced by a simple walking beam 70 which is pivotally mounted, intermediate the length thereof, to a stanchion 72 by means of a pivot pin 74. A same ramp 66 is fixed to the one end of the beam 70, and a compression spring 76 is disposed beneath the opposite end of the beam and the housing wall 16. Spring 76 is formed of beryllium copper and, upon its exposure to an inordinately high fluid temperature, it expands to cause a counter-clockwise tilt or rotation of the beam 70. As a means of finitely controlling the responsiveness of the valve of this embodiment a simple compression spring 78 is set beneath the beam 70, and the wall 16, between the stanchion 72 and the ramped end of the beam 70. In addition, a spring-adjusting screw 80 is in penetration of the wall 16, having its leading end engaging the lowermost end of the spring 78. By experimentation, and adjustment of the screw 80, a rather precise temperature regulation of the through-flowing fluid can be effected.

The aforesaid alternative embodiment of the invention, and all other modifications and alternatives, which will occur to others by taking teaching from my disclosure herein, are deemed to be within the ambit of my invention, and embraced by the appended claims. My disclosure allows as how the novel valve will find especial utility in water-shower heads. It is to be understood, however, that the invention is not any less utilitarian in regulating the elevated temperature and flow of fluids other than water, such as oil, liquid chemicals, and the like. Simply, a specific application of this novel valve is not to be considered limiting of its universality.

I claim:

1. A temperature and flow control valve, comprising:

a valve housing having a given axis;

first means at one axial end of said housing for admitting fluid therethrough and into said housing; and second means at the opposite axial end of said housing for discharging fluid therethrough and from said housing; wherein said second means has a valve seat formed therewithin;

valving means, within said housing, and movable both toward and away from said seat for (a) closing off said second means to prohibit fluid flow through said second means, and (b) accommodating fluid flow through said second means, respectively;

means within said housing, and interposed between said seat and said valving means, for urging said valving means away from said seat;

barrier means, within said housing, for barring movement of said valving means to said one axial end of said housing;

piston means interposed between said barrier means and said first means for moving said valving means onto said seat for closure of said second means to fluid flow therethrough; and wherein said barrier means comprises means (a) for restraining said piston means from causing movement of said valving means, and (b) responsive to a given temperature of admitted fluid for releasing said piston means, to permit said piston means to move said valving means onto said seat, respectively.

2. A temperature and flow control valve, according to claim 1, wherein:

said housing defines a circumferentially-walled chamber which extends from said seat to said first means;

said chamber has a given diameter at said seat end thereof, and a uniformly increasing diameter to said barrier means; and said valving means has said given diameter.

3. A temperature and flow control valve, according to claim 1, wherein:

said first and second means have boreholes formed centrally therein; and further including a rod penetrating said boreholes, extending outwardly from both axial ends of said housing, in penetration of said valving means, and in penetration of said piston means; and wherein said piston means comprises a piston; and said piston is fixed to said rod for effecting axial movement of said rod coincident with movement of said piston.

4. A temperature and flow control valve, according to claim 1, wherein:

said valving means comprises a generally ball-shaped element;

said element has a cylindrical bore formed therein; and said urging means comprises a compression spring having one end thereof set against said seat, and the opposite end thereof nested in said cylindrical bore.

5. A temperature and flow control valve, according to claim 1, wherein:

said housing defines a chamber having a circumferential wall; and said barrier means comprises an abutment fixed to, and extending into said chamber from, said wall.

6. A temperature and flow control valve, according to claim 1, wherein:

said housing defines a chamber having a circumferential wall; and said restraining means comprises a limb fixed to said wall; wherein said limb has an abutment mounted thereon.

7. A temperature and flow control valve, according to claim 6, wherein:

said piston means comprises a piston, and a compression spring interposed between said piston and said first means; and said piston abuts said abutment.

8. A temperature and flow control valve, according to claim 7, wherein:

said abutment has a tapered ramp surface.

9. A temperature and flow control valve, according to claim 6, wherein:

said limb is cantilevered on a support; and further including means in penetration of said wall and adjustable for delimiting flexure of said limb.

10. A temperature and flow control valve, according to claim 6, wherein:

said limb is formed of beryllium copper.

11. A temperature and flow control valve, according to claim 3, wherein:

said rod has a limit stop at one end thereof, and a button at the opposite end.

12. A temperature and flow control valve, comprising:

a housing having a circumferential wall, and a given axis;

first means at one axial end of said housing for admitting fluid therethrough and into said housing; and second means at the opposite end of said housing for discharging fluid therethrough and from said housing; wherein said second means has a valve seat formed therewithin;

valving means, within said housing, and movable both toward and away from said seat for (a) closing off said second means to prohibit fluid flow through said second means, and (b) accommodating fluid flow through said second means, respectively; wherein said valving means comprises means cooperative with said wall for metering fluid discharge through said second means; and barrier means, mounted to said wall, for barring movement of said valving means to said one axial end of said housing; and means interposed between said barrier means and said first means for moving said valving means onto said seat; wherein said barrier means is normally operative for preventing said interposed means from moving said valving means, and operative in response to a given temperature of admitted fluid for permitting said interposed means to move said valving means to said seat.

13. A temperature and flow control valve, according to claim 12, wherein:

said will is cooperative with said first means and said seat for defining a fluid chamber therebetween within said housing;

said chamber has a given diameter at said seat end thereof, and a uniformly increasing diameter to said barrier means; and said valving means comprises a generally ball-shaped element having said given diameter.

14. A temperature and flow control valve, according to claim 6, wherein:

said limb comprises a walking beam;

said beam is pivotably mounted, intermediate the length thereof, to a stanchion which rises from said wall; and said temperature responsive means comprises a beryllium copper element interposed between an end of said beam which is opposite said abutment and said wall.

15. A temperature and flow control valve, according to claim 14, wherein:

said element is a compression spring.

16. A temperature and flow control valve, according to claim 15, further including:

means interposed between said beam and said wall for regulatingly adjusting the pivoting response of the beam.

17. A temperature and flow control valve, according to claim 16, wherein:

said adjusting means comprises an additional compression spring.

18. A temperature and flow control valve, according to claim 17, further including:

an adjustment screw, in penetration of said wall, and having the leading end thereof in contacting engagement with an end of said additional compression spring.

* * * * *